United States Patent
Duvaut et al.

(10) Patent No.: US 7,295,603 B2
(45) Date of Patent: Nov. 13, 2007

(54) METHOD AND SYSTEM FOR VIRTUAL EXCHANGE REFERENCE IMPACT (VERI) FOR USE IN MIXED SPECTRUM MANAGEMENT IN DSL

(75) Inventors: Patrick Duvaut, Tinton Falls, NJ (US); Ehud Langberg, Wayside, NJ (US); Anupama Ramalingam, Sayreville, NJ (US)

(73) Assignee: Conexant Systems, Inc., Red Bank, NJ (US)

( * ) Notice: Subject to any disclaimer, the term of this patent is extended or adjusted under 35 U.S.C. 154(b) by 176 days.

(21) Appl. No.: 11/009,710

(22) Filed: Dec. 13, 2004

(65) Prior Publication Data

US 2006/0126707 A1    Jun. 15, 2006

(51) Int. Cl.
*H04B 1/38*    (2006.01)
*H04L 5/16*    (2006.01)

(52) U.S. Cl. ............... 375/222; 375/219; 379/115.01; 379/219; 379/240

(58) Field of Classification Search ............... 375/222, 375/346, 219; 370/249, 349; 379/115.01, 379/219, 240

See application file for complete search history.

(56) References Cited

U.S. PATENT DOCUMENTS

| | | | |
|---|---|---|---|
| 6,999,583 B2* | 2/2006 | Valenti et al. | 379/417 |
| 7,058,125 B2* | 6/2006 | Cherubini | 375/225 |
| 7,158,563 B2* | 1/2007 | Ginis et al. | 375/224 |
| 2003/0112967 A1* | 6/2003 | Hausman et al. | 379/417 |
| 2004/0174903 A1* | 9/2004 | Duvaut et al. | 370/469 |
| 2005/0213714 A1* | 9/2005 | Langberg et al. | 379/32.01 |

* cited by examiner

*Primary Examiner*—Ted Wang
(74) *Attorney, Agent, or Firm*—Thomas, Kayden, Horstemeyer & Risley, LLP

(57) ABSTRACT

A method and apparatus implements a Virtual Exchange Reference Impact (VERI) technique to define a pattern to shape the spectrum of a cabinet deployed system to minimize its impact, e.g., FEXT, into an exchange deployed system while achieving effective cabinet system performance, e.g., in terms of data transmission rate. The invention shapes the cabinet system to replicate a self-impact of the exchange system on itself based on the known distance of the cabinet from the exchange. The shaping is required when both exchange and cabinet systems share the same bundle and exhibit overlapped bandwidths. A particular example consists of VDSL deployed from remote cabinet impacting ADSL2/ADSL2+ deployed from the exchange.

18 Claims, 16 Drawing Sheets

METHOD AND SYSTEM FOR VIRTUAL EXCHANGE REFERENCE IMPACT (VERI) FOR USE IN MIXED SPECTRUM MANAGEMENT IN DSL

FIELD OF THE INVENTION

The invention relates generally to the field of communications and concerns techniques for use in Discrete Multi-tone (DMT) Asynchronous Digital Subscriber Line (ADSL) communications systems, including, e.g., systems following the ITU-T G.992.5/ADSL2+, ETSI TS101-270/VDSL and ANSI TI.424/VDSL standards. More particularly, the invention relates to techniques aimed at eliminating or reducing the impact associated with electromagnetic coupling effects on copper pairs sharing a common bundle in typical field deployed communications systems and to systems and methods for improving transmission performance in such systems. The following list of acronyms is provided for ease of reference.

LIST OF ACRONYMS

ADSL—Asymmetric Digital Subscriber Line
A/D—Analog/Digital
D/A—Digital/Analog
ASK—Amplitude Shift Keying
CPE—Customer Premise Equipment
TTCM—Turbo Trellis Coded Modulation
QAM—Quadrature Amplitude Modulation
LSB—Least Significant Bit
MSB—Most Significant Bit
SNR—Signal to Noise Ratio
S/P—Serial-to-Parallel
BPSK—Binary Phase Shift Keying
QPSK—Quadrature Phase Shift Keying
BER—Bit Error Rate
VDSL—Very-High bit rate Digital Subscriber Line (also VHDSL)
FFT—Fast Fourier Transform
IFFT—Inverse Fast Fourier Transform
INP—Impulse Noise Protection
ISI—Inter-Symbol-Interference
RS—Reed-Soloman (error-correction code)
GCI—Generalized Convolutional Interleaver
SRA—Seamless Rate Adaptation
DRR—Dynamic Rate Repartitioning

BACKGROUND

The present invention relates generally to the field of telecommunications and, more particularly, to delivering services over telephone (switched) networks (POTS, PSTN, ISDN, TCM-ISDN (Time Compression Multiplex-ISDN)) and leased point-to-point two-wire telephone type circuits, such as via modems or other forms of transceivers operating over twisted pair. An exemplary system might have a data signaling rate of 33600 bits/second. For example, multi-channel, multi-carrier communications systems such as discrete multi-tone (DMT) systems may be used and may involve Central Office (CO) exchanges along with Remote Terminal (RT) or Remote Unit (RU) cabinets for delivery to and from Customer Premise Equipment (CP or CPE).

The explosive growth of the internet has created a demand for high data rates for business and residential users (SOHO—small office/home office) that rely on standard analog communications systems, for example plain old telephone systems (POTS) that use a copper wire twisted pair to carry information. The need for high-speed access to the home is increasing due to the availability of information, data, high-bandwidth video and the like from the world wide web. Because of such demand, higher speed modems are required; modems operating at rates of for example 33,600 bits/second are now in use. A multitude of competing communication technologies provide high-speed access to the home such as cable modems and, digital subscriber line (xDSL) equipment. DSL equipment utilize the existing analog POTS that use a copper wire twisted pair to carry the information. Because of bandwidth limitation (4 KHz), and power limitation of the telephone network, line coding schemes are used to encode digital signals into analog signals that convey the analog information over the analog telephone network. Such line coding schemes should avoid the undesirable bandwidth or power increase.

Line coding schemes manipulate the analog carrier signal, which has three attributes, amplitude, phase and frequency. One or more of such attributes may be manipulated by known modulation techniques, one is quadrature amplitude modulation (QAM) whereby the carrier signal's phase and amplitude is modulated to encode more data within a frequency bandwidth. One example of a QAM modulation system sends two bits of information per QAM symbol, where the digital values can be encoded and the corresponding amplitude and phase can be represented using the constellation.

Data from a personal computer or other equipment at the customer premise (CPE) are sent to a transmitter which arranges the data into frame packets; the packetized signal is then quadrature amplitude modulation encoded and error encoded using trellis encoding to improve the noise immunity using a convolutional coder to select a sequence of subsets in a partitioned signal constellation. A numerical symbol vector is trellis encoded. The trellis encoding starts with the most significant symbol and ends with the least significant symbol of the vector, a process which employs convolutional encoding that converts the input symbol to another symbol and then maps the encoded symbol to its corresponding 16 QAM signal constellation point.

VDSL provides symmetric and asymmetric bandwidth and reference standards have been developed by International Telecommunications Union (ITU-T), American National Standards Institute (ANSI) T1/E1, and European Telecommunications Standards Institute (ETSI). Standards of particular interest are T1.424; ITU G.993.1; TS101 270-1; and TS101 270-2, all of which are incorporated herein by reference. Although the invention relates to bi-directional transceivers, it is directed to solving a problem that occurs in only the downstream direction from the exchange/cabinet to the CPE.

A conventional multi-carrier VDSL system normally consists of a data-to-symbol converter, an IFFT, a cyclic extension adder, D/A converter for its transmitter, and an A/D converter, a FFT, a frequency domain equalizer, and a symbol-to-data converter for its receiver.

With reference to an exemplary xDSL deployment, such as that of FIG. 1, a first xDSL system is deployed from the exchange 102, such as a central office, to a first CP 104, while another system is deployed from the cabinet 106, such as a remote terminal, to a second CP 108. In this example, both systems propagate along copper pairs that share a common bundle. The two pairs are electromagnetically coupled with the cabinet system exhibiting an impact into the exchange based system in the form of Far End Cross-Talk (FEXT), represented by arrow 120. It is assumed that both systems share a common bandwidth $B_E$. The distance between the exchange and the cabinet is denoted y, 110. The distance between the cabinet and the customer premise CP1 that receives the downstream exchange payload is x, 112. The distance between the cabinet and its targeted customer premise CP2 may be denoted as z.

SUMMARY OF THE INVENTION

The present invention provides a method and apparatus for implementing a Virtual Exchange Reference Impact (VERI) technique to define a pattern to shape the spectrum of a cabinet deployed system to minimize its impact into an exchange deployed system while achieving effective cabinet system performance. The invention shapes the cabinet system to replicate a self-impact of the exchange system on itself based on the known distance of the cabinet from the exchange. The shaping is required when both exchange and cabinet systems share the same bundle and exhibit overlapped bandwidths. A particular example consists of VDSL deployed from remote cabinet impacting ADSL2/ADSL2+ deployed from the exchange.

BRIEF DESCRIPTION OF THE DRAWINGS

The purpose and advantages of the present invention will be apparent to those of ordinary skill in the art from the following detailed description in conjunction with the appended drawings in which like reference characters are used to indicate like elements, and in which.

DETAILED DESCRIPTION OF THE INVENTION

The following description is intended to convey a thorough understanding of the invention by providing specific embodiments and details involving providing a virtual exchange reference impact to a cabinet system electromagnetically coupled to an exchange system to reduce the impact of the cabinet system into the exchange system. More particularly, the exemplary embodiments describes a mask for applying to the cabinet system to effectively replicate the self-impact of the exchange system to mitigate the impact effects, such as FEXT, on CP1. It is understood, however, that the invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Figure 1:
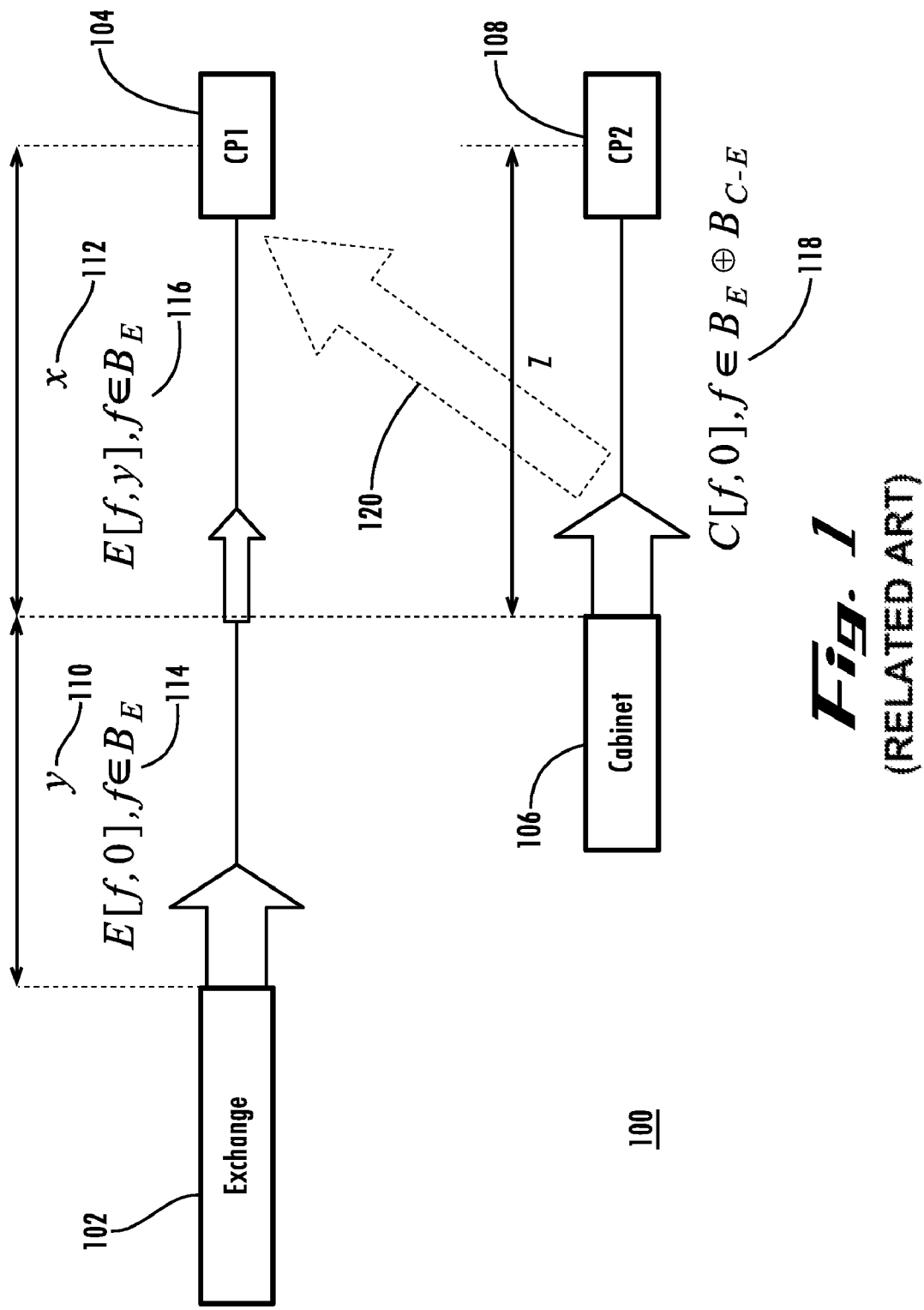
FIG. 1 is a schematic diagram illustrating a cabinet deployed system impacting an exchange deployed system.

Referring now to FIG. 1, a schematic diagram illustrates an exemplary bundled system electromagnetically coupled as a result of proximity of electrical wires. In the exchange system 102, E[f,0] 114 denotes the transmitted power spectral density (PSD) from the exchange 102 across the common bandwidth $B_E$. E[f,y] 116 denotes the attenuated exchange PSD by a piece of exchange loop of length y 110. The length y 110 represents the distance of the cabinet from the exchange and the attenuated exchange PSD represents the PSD at the level of the cabinet:

$$E[f,y]=E[f,0]|H_E[f,y]|^2 \qquad (1)$$

In equation (1), $H_E[f,y]$ designates the frequency response of the exchange loop 102 with length y 110.

C[f,0] denotes the transmitted power spectral density from the cabinet 106. Because of the electromagnetic coupling between the exchange pair and the cabinet pair that share the same bundle, the received PSD at CP1, E[f,y+x], experiences a FEXT interference from the cabinet deployed system 106 that takes the following form across the common bandwidth $B_E$:

$$\gamma_{FEXT}[f,x] = \alpha_{FEXT} x f^2 |H_E[f,x]|^2 C[f,0], f \in B_E \quad (2)$$

At CP1 104, the exchange signal-to-cabinet FEXT ratio is equal to:

$$SFR[f, y, x] = \frac{E[f, y]}{C[f, 0]} \frac{1}{\alpha_{FEXT} x f^2}, \quad f \in B_E \quad (3)$$

At CP2 108, the received PSD from the cabinet 106 takes the following form:

$$C[f,z] = [f,0]/|H_c[f,z]|^2 \quad (4)$$

One design object is to qualitatively define a pattern to shape the cabinet transmit PSD 118, C[f,0], in such a way that the exchange signal-to-cabinet FEXT ratio given by Equation (3) is as large as possible while keeping a minimum/or a certain amount of received power at CP2 108, C[f,z], f∈$B_E$, within the common bandwidth. Because the distance from the exchange 102 to CP1 104 is much greater than the distance from the cabinet 106 to CP2 108, the impact, e.g., FEXT, of the exchange into the cabinet system is relatively minor. The distance z from the cabinet 106 to CP2 108 is not of concern in this analysis or solution.

Figure 2:
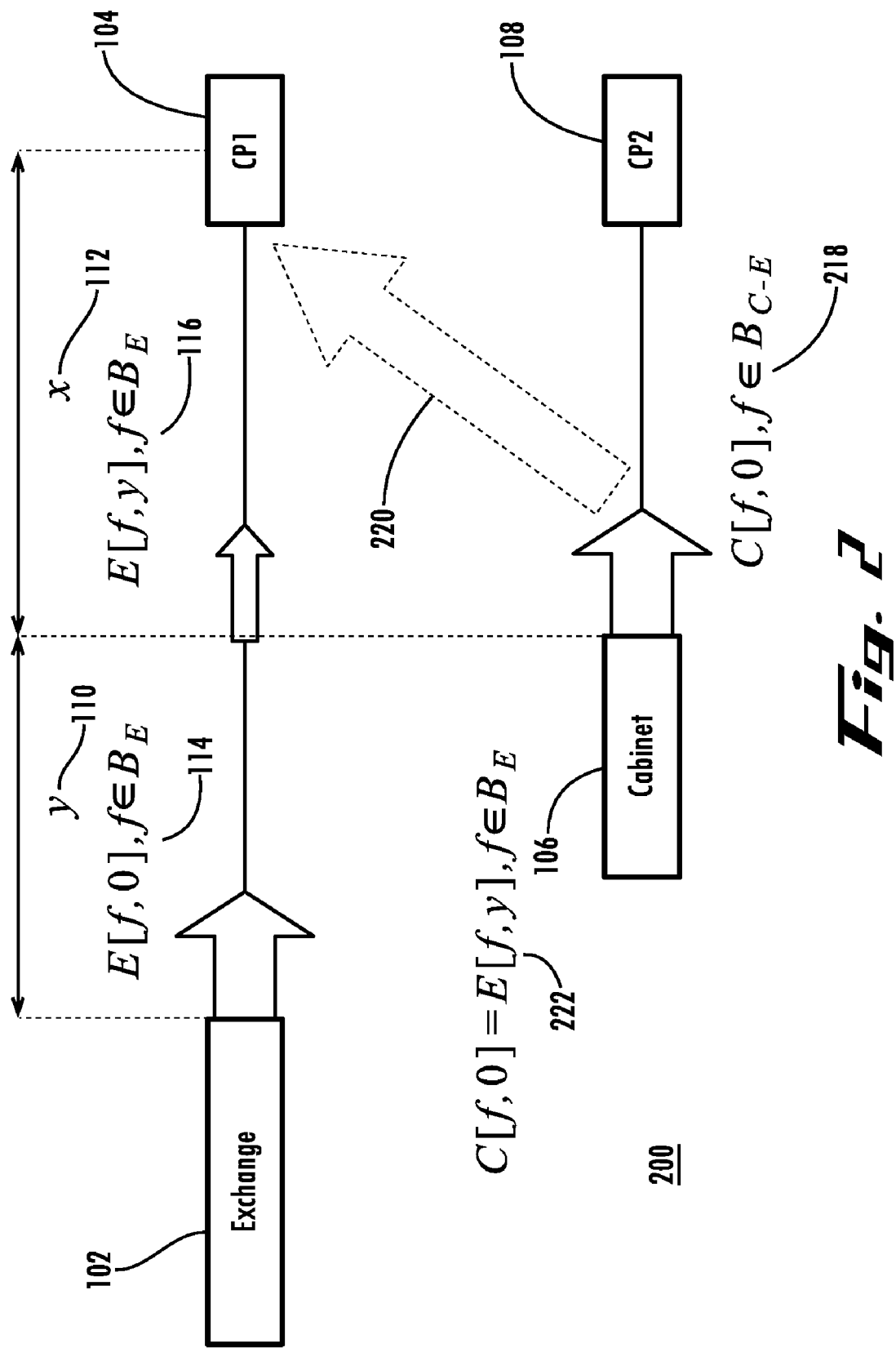
FIG. 2 is a schematic diagram illustrating the implementation of the inventive VERI shaping pattern on the cabinet deployed system effecting a reduced impact of the cabinet deployed system into the exchange deployed system.

In the embodiment of the present invention of FIG. 2, the impact, in the form of FEXT as illustrated by arrow 220, of cabinet system 106 into exchange system 102 serving CP1 104 is substantially eliminated. To eliminate or greatly reduce the impact 220 a virtual exchange reference impact (VERI) is implemented to replicate in the cabinet system the self-impact of the exchange system at a known or knowable distance y 110 of the cabinet from the exchange. The distance y 110 must be known to apply the proper VERI mask. The VERI solution limits the cabinet deployed impact to the self-reference impact a virtual exchange located at distance y would generate, while transmitting a PSD 116 equal to E[f,y], already attenuated by the piece of loop between the exchange and the cabinet.

The VERI solution provides the following shaping pattern, for use in shaping the VDSL mask, across the common bandwidth:

$$C[f,0] \propto E[f,y] = E[f,0]|H_E[f,y]|^2 \quad (5)$$

The solution fully contemplates the balance between minimizing/eliminating impact on CP1 with any commensurate degradation in performance, i.e., lowering of data rate, in the cabinet system. While the preferred embodiment would have the proportional relationship one of equality, it should be appreciated that the equation may be expressed as an inequality, which may be applied within the spirit of the present invention. The use of the inequality in the expression/solution will adversely affect performance as compared to the preferred equality, but the desired effect will occur. For instance:

$$C[f,0] \leq E[f,y], f \in B \quad (6)$$

Figure 3:
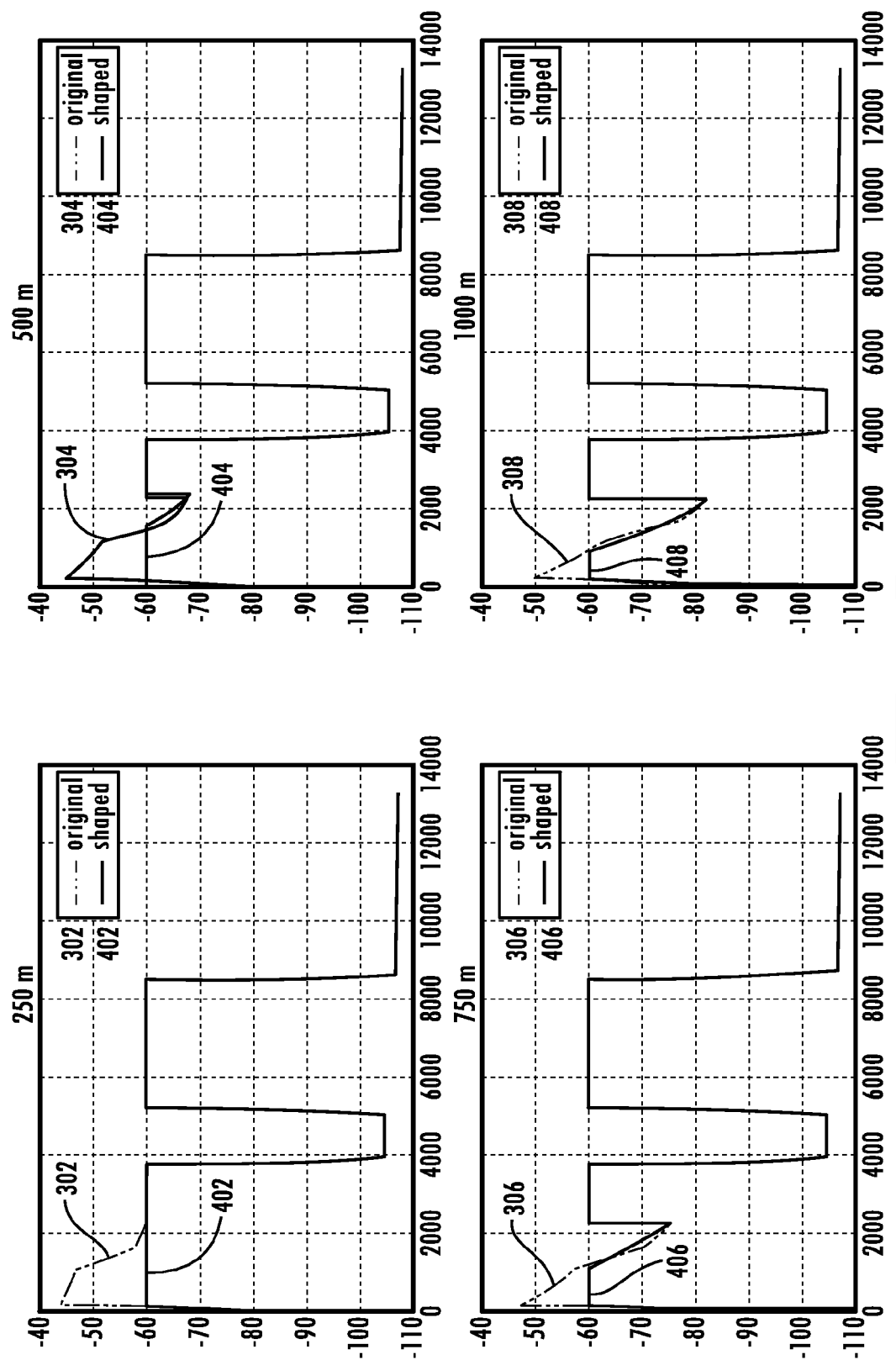
FIG. 3 represents a series of graphs depicting a comparison in the performance of the original VDSL (302/304/306/308) and the VERI-shaped VDSL cabinet mask (402/404/406/408) for distances, respectively, of 250 m/500 m/750 m/1000 m from the cabinet to the exchange.
Figure 4:
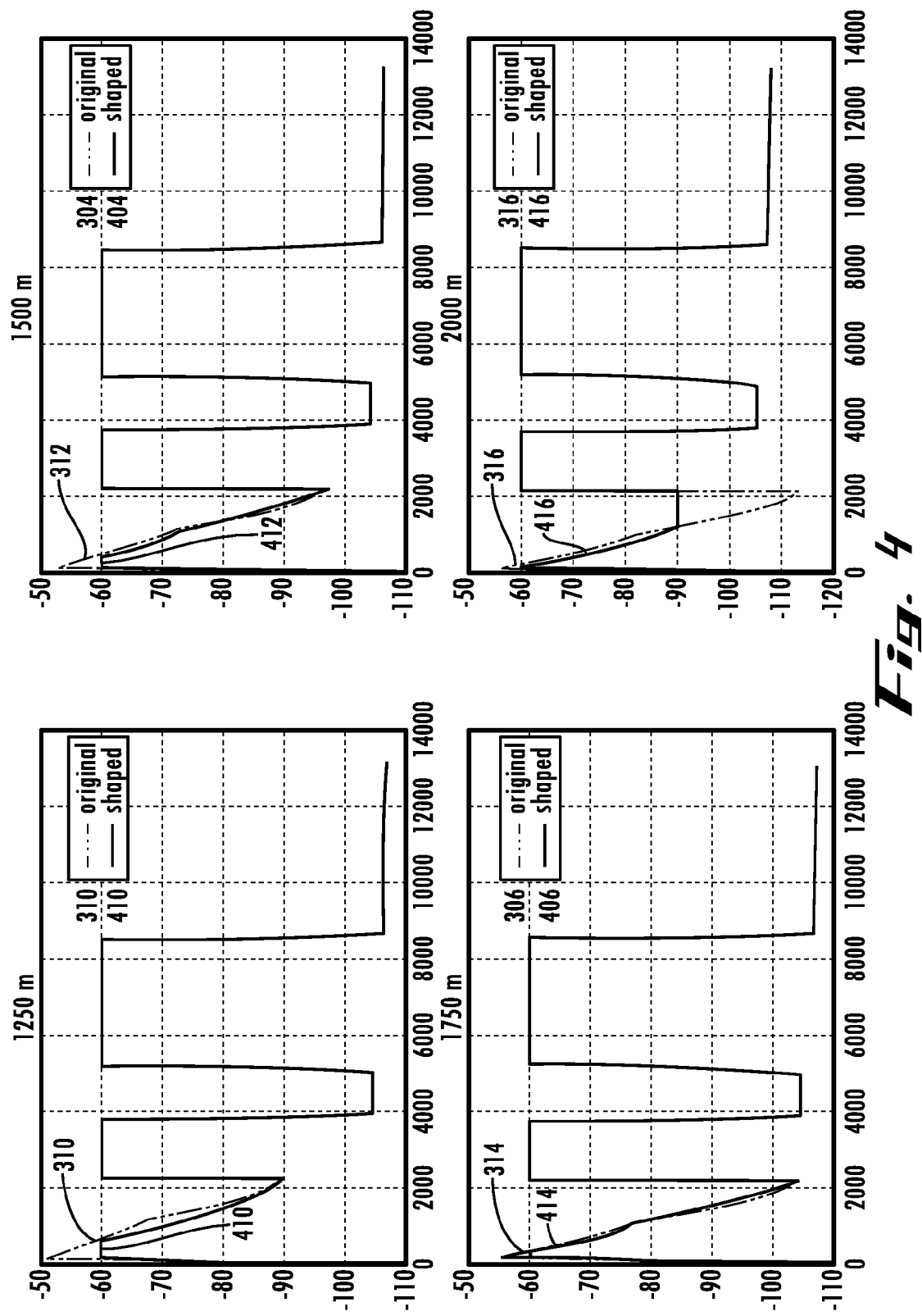
FIG. 4 represents a series of graphs depicting a comparison in the performance of the original VDSL (310/312/314/316) and the VERI-shaped VDSL cabinet mask (410/412/414/416) for distances, respectively, of 1250 m/1500 m/1750 m/2000 m from the cabinet to the exchange.
Figure 5:
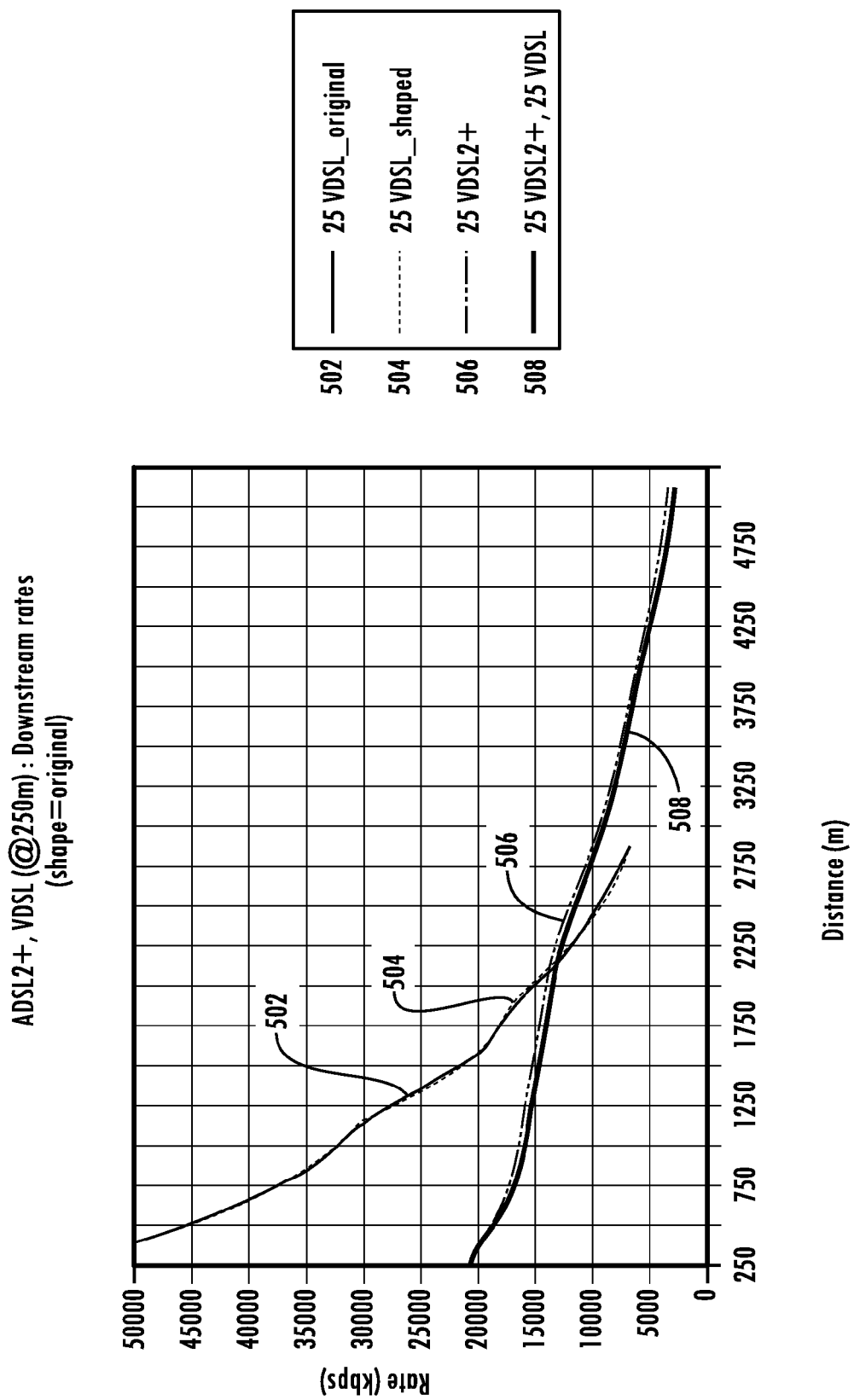
FIG. 5 is a graph depicting a simulation of system performance at a cabinet-to-exchange distance of 250 m with system performance measured in downstream data rate over distance.
Figure 6:
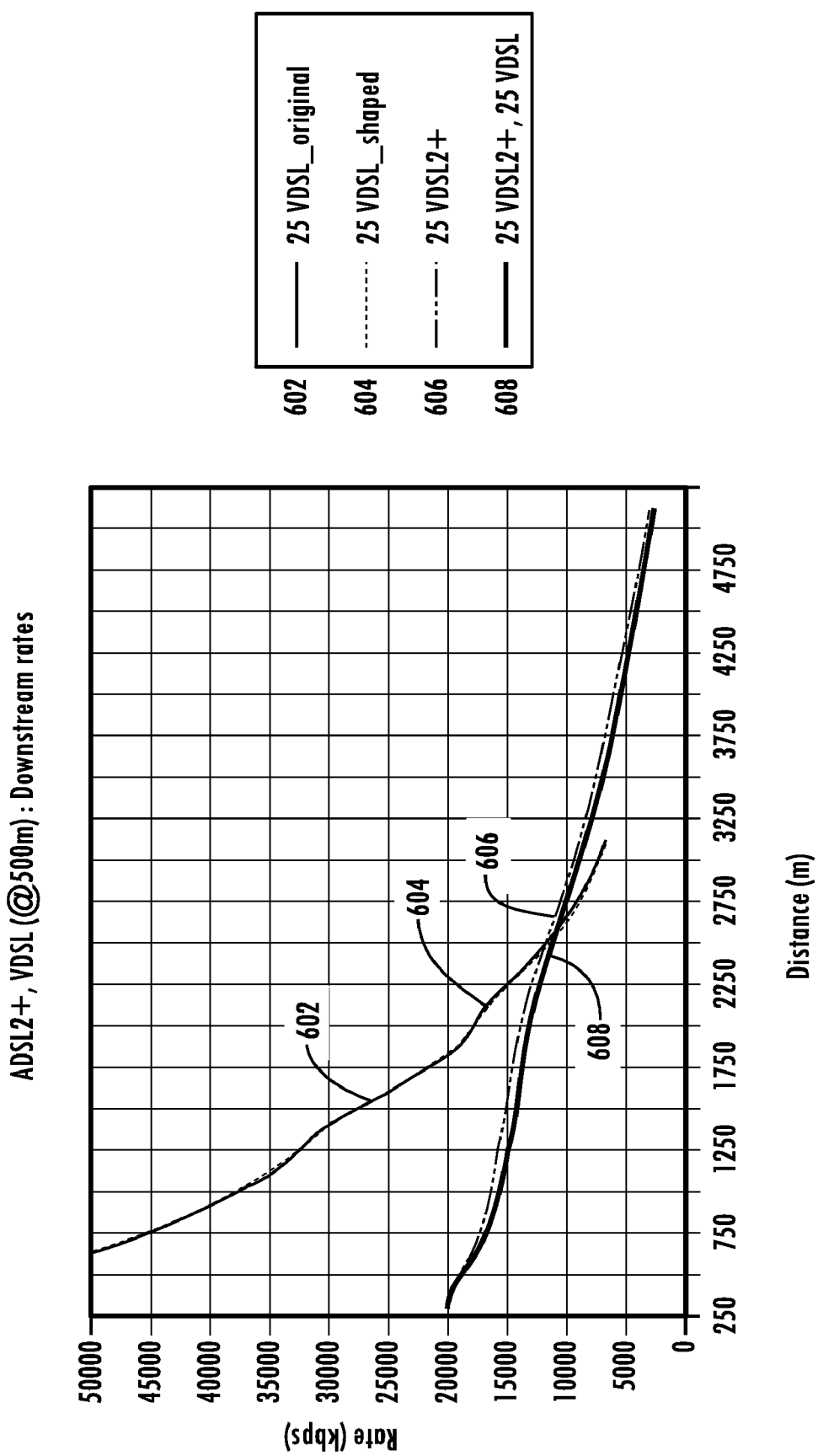
FIG. 6 is a graph depicting a simulation of system performance at a cabinet-to-exchange distance of 500 m with system performance measured in downstream data rate over distance.
Figure 7:
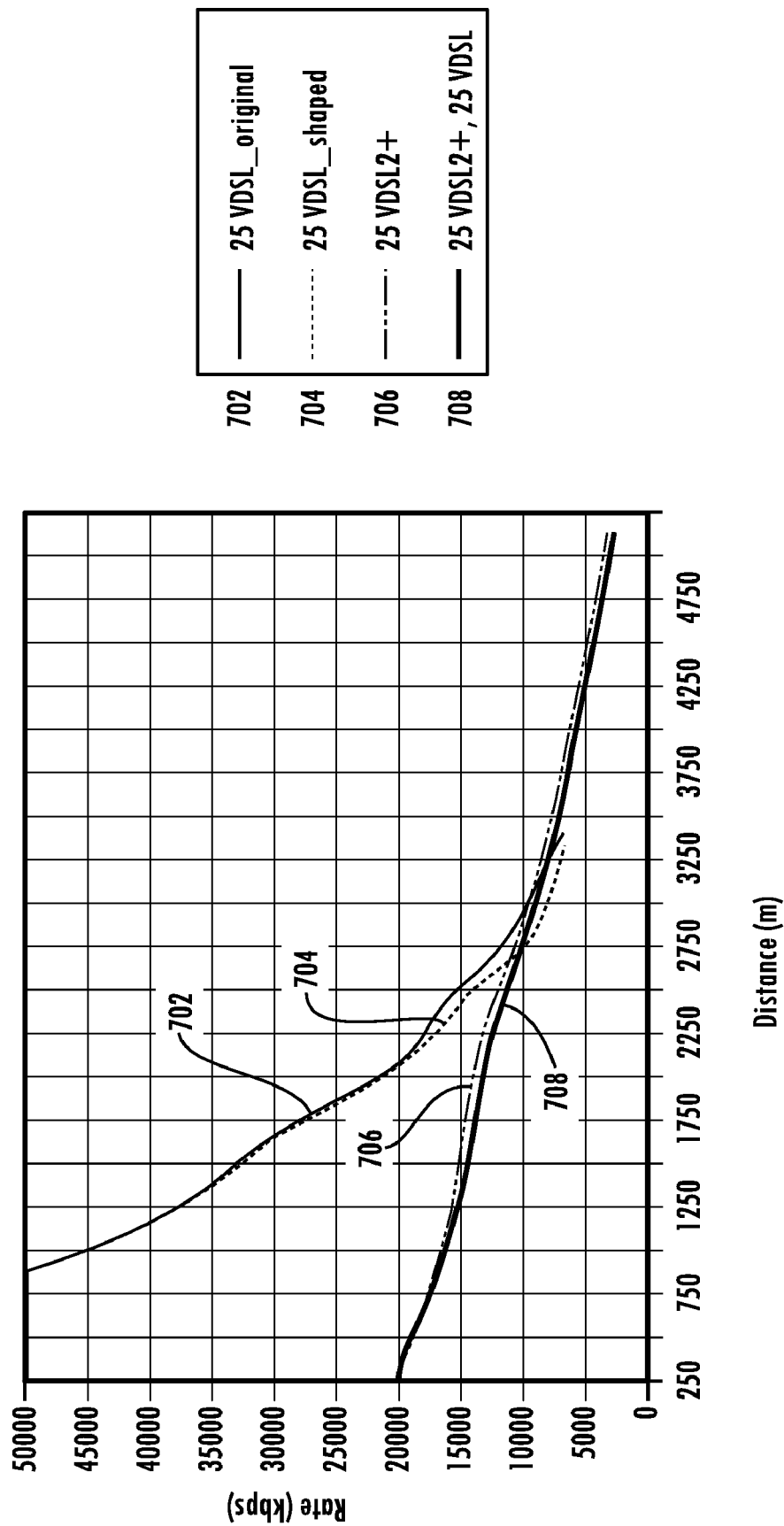
FIG. 7 is a graph depicting a simulation of system performance at a cabinet-to-exchange distance of 750 m with system performance measured in downstream data rate over distance.
Figure 8:
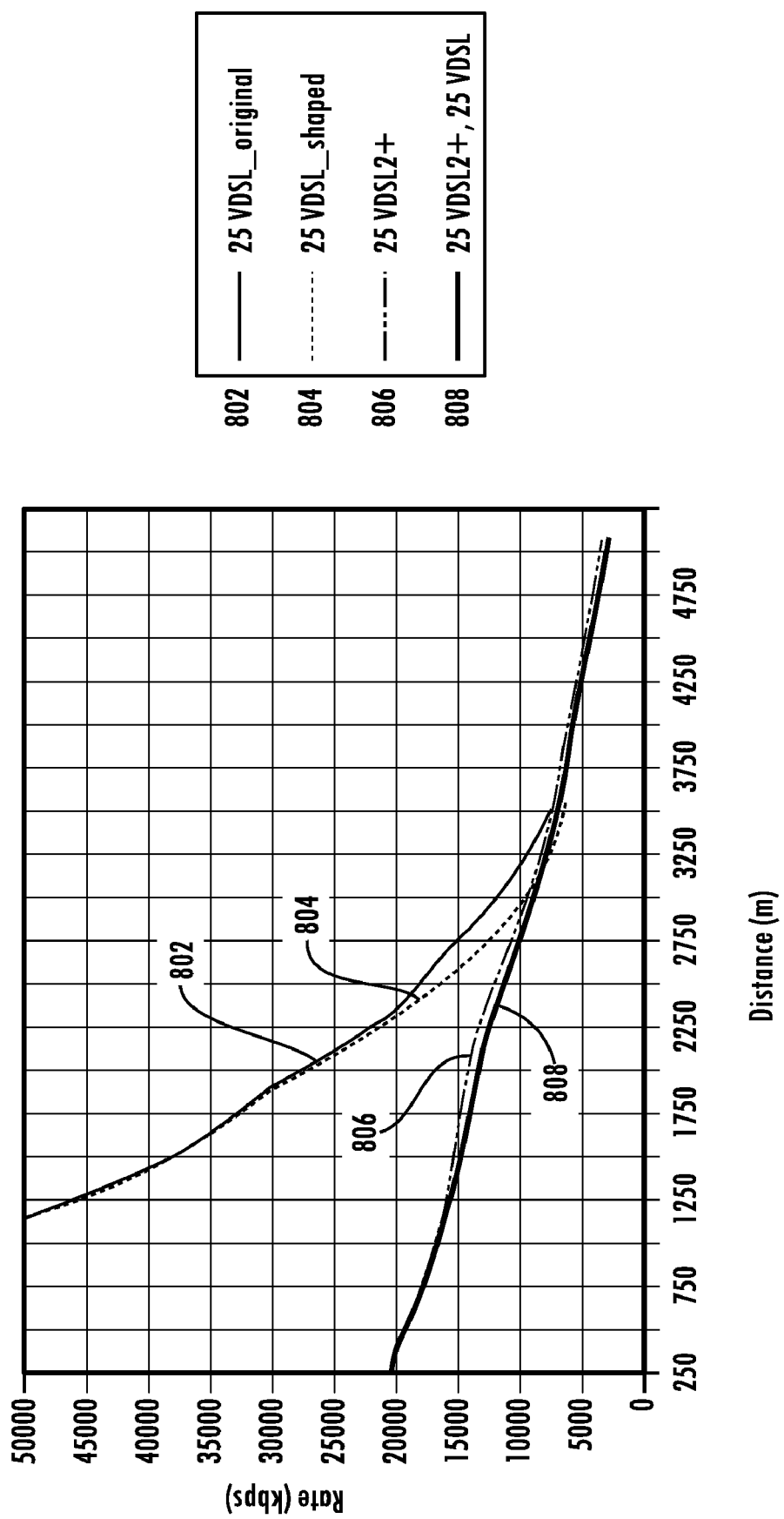
FIG. 8 is a graph depicting a simulation of system performance at a cabinet-to-exchange distance of 1000 m with system performance measured in downstream data rate over distance.
Figure 9:
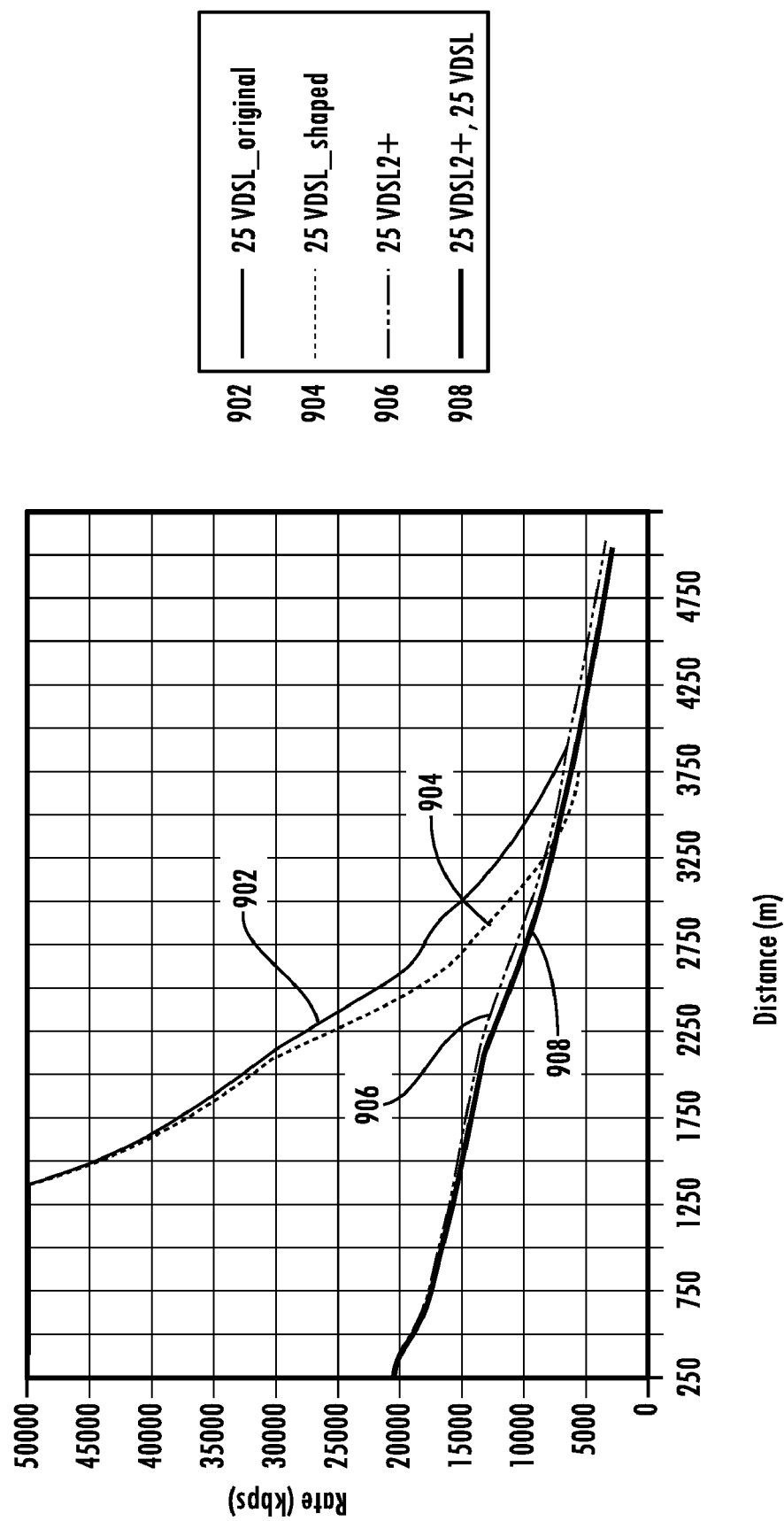
FIG. 9 is a graph depicting a simulation of system performance at a cabinet-to-exchange distance of 1250 m with system performance measured in downstream data rate over distance.
Figure 10:
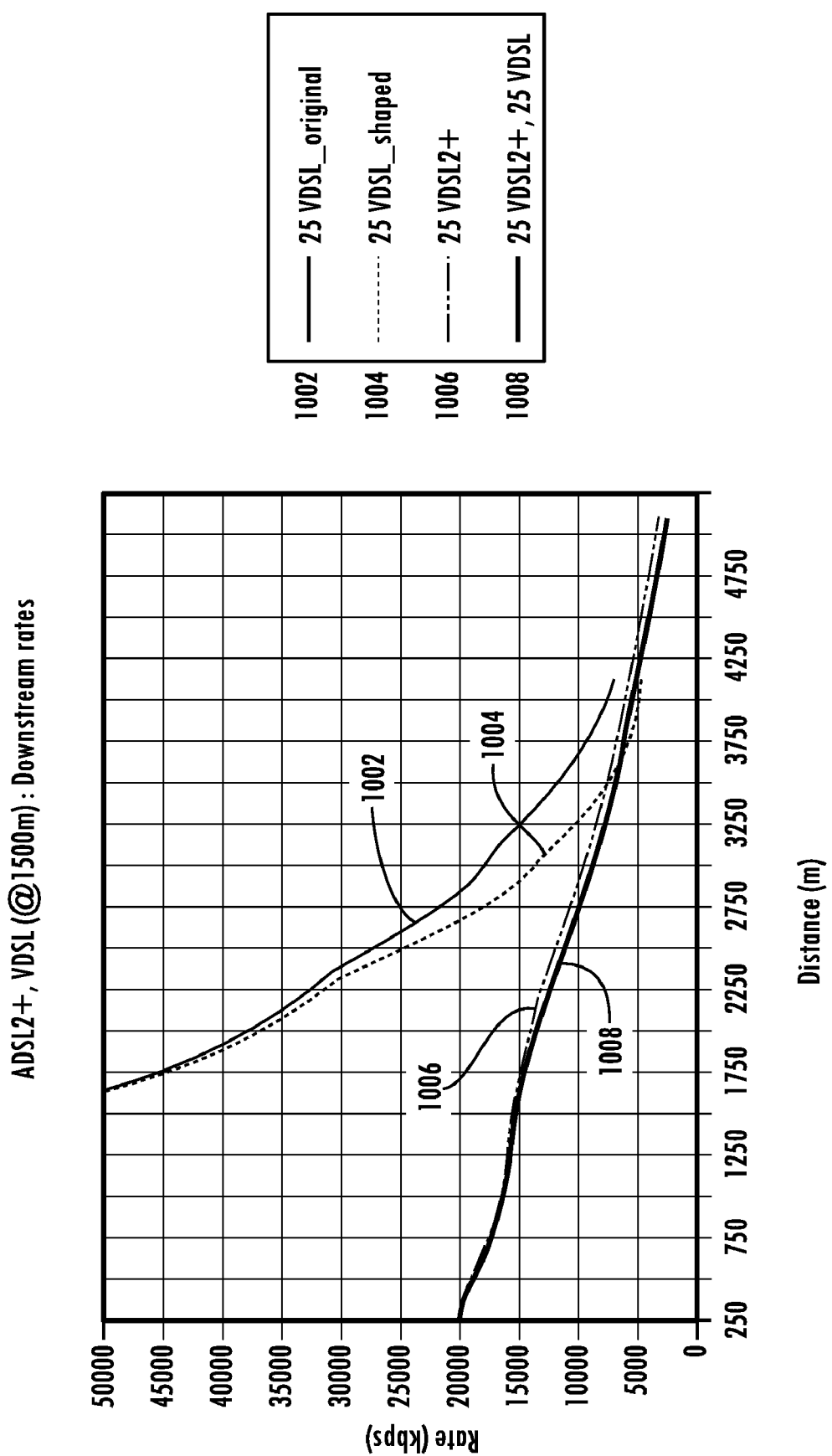
FIG. 10 is a graph depicting a simulation of system performance at a cabinet-to-exchange distance of 1500 m with system performance measured in downstream data rate over distance.
Figure 11:
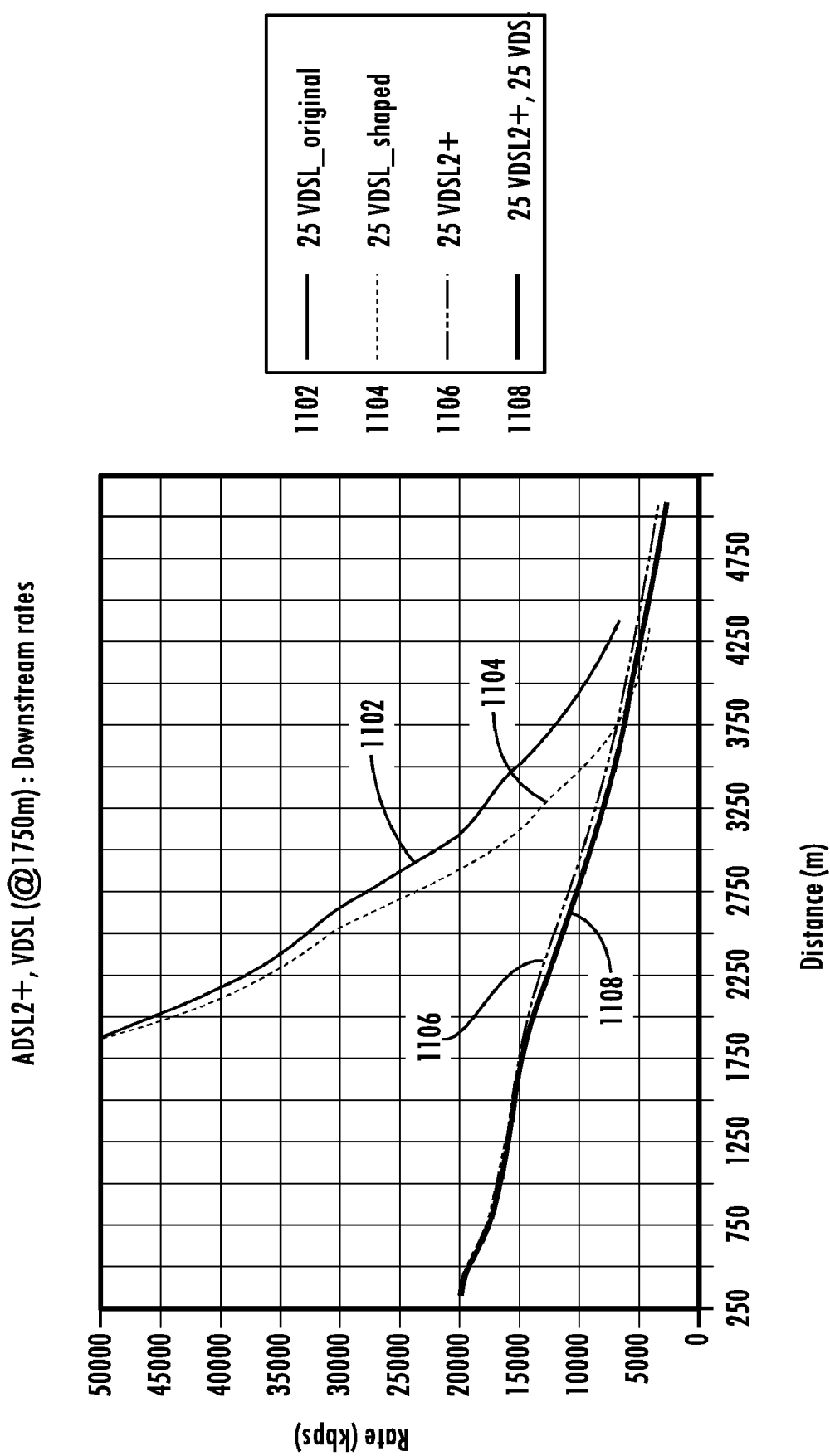
FIG. 11 is a graph depicting a simulation of system performance at a cabinet-to-exchange distance of 1750 m with system performance measured in downstream data rate over distance.
Figure 12:
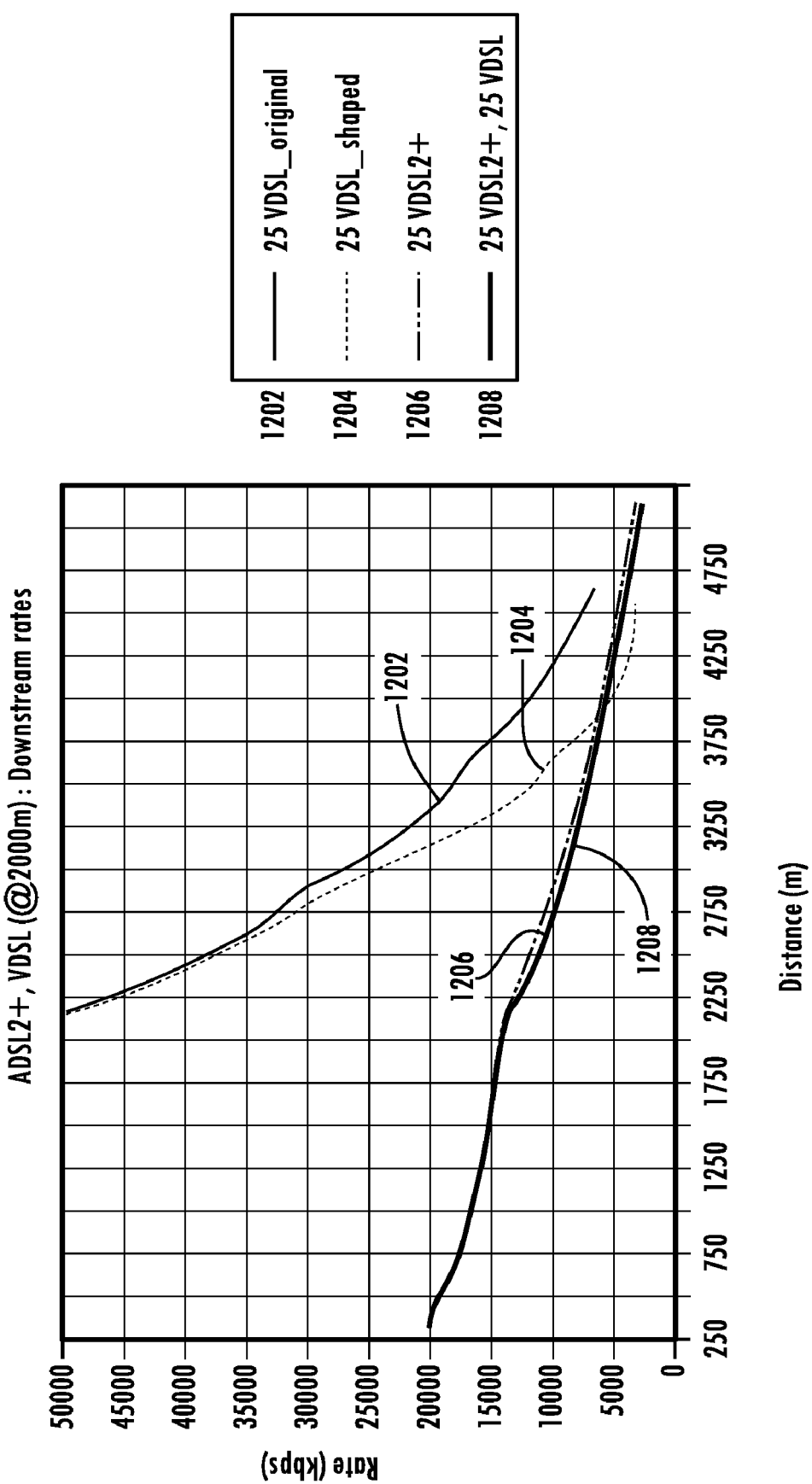
FIG. 12 is a graph depicting a simulation of system performance at a cabinet-to-exchange distance of 2000 m with system performance measured in downstream data rate over distance.

As for the series of graphs of FIGS. 3 and 4, each graph represents a comparison in the performance of the original VDSL (302/304/306/308/310/312/314/316) and the VERI-shaped VDSL cabinet mask (402/404/406/408/410/412/414/416) for distances, respectively, of 250 m/500 m/750 m/1000 m/1250 m/1500 m/1750 m/2000 m from the cabinet to the exchange. As shown, the abscissa represents frequency in khz and the ordinate represents the PSD in dBm/Hz.

The series of graphs of FIGS. 5-12 represents simulations of system performance at cabinet to exchange distances of 250 m, 500 m, 750 m, 1000 m, 1250 m, 1500 m, 1750 m and 2000 m, respectively, with system performance measured in downstream data rate (ordinate in kpbs) over distance 250 m-4750 m. Each graphical simulation includes the 25 VDSL_original plot (502-1202), 25 VDSL_shaped plot (504-1204), 25 ADSL2+ plot (506-1206), and 25 ADSL2+, 25 VDSL plot (508-1208). With respect to FIG. 5, the original plot 502 assumes the original spectrum without shaping and the plot 504 assumes a shaped VDSL mask applied. The exchange plot of 506 assumes ADSL2+ while the plot 508 assumes a plot disturbed by both ADSL2+ and VDSL. The comparison of the original plot 502 and the shaped plot 504 shows confirms that at the relatively short distance of 250 m, shaping has no real impact on system performance. As shown in the series of graphs, as the distance between the exchange and the cabinet increases, the need for shaping increases and the resulting benefits increase as well. For instance the plots of the original and shaped VDSL graphs diverge and become increasingly separated as represented in the graphs, with the shaped VDSL plots yielding a better performance in terms of data rate.

Figure 13:
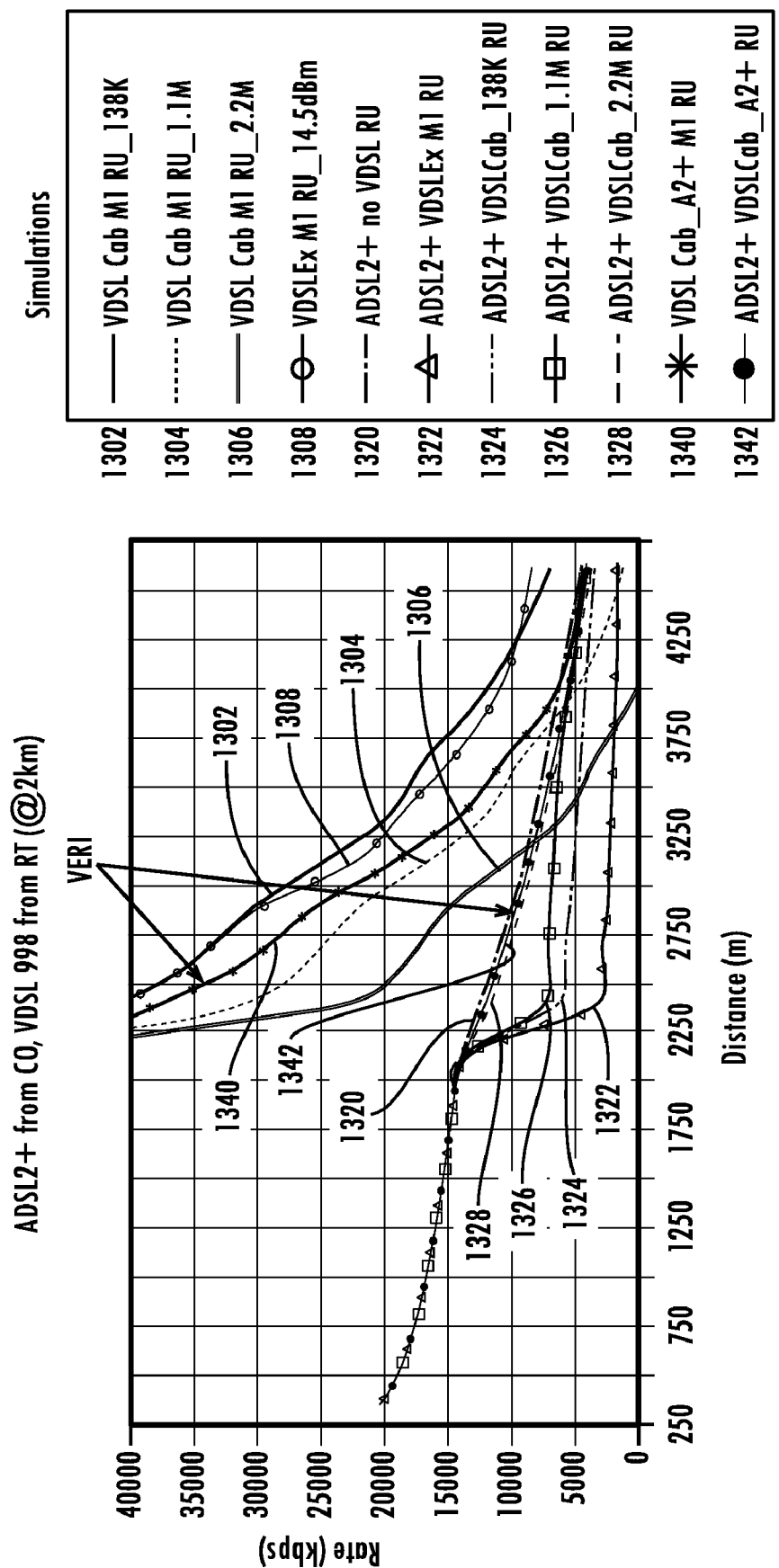
FIG. 13 is a graph depicting a series of simulations of cabinet and exchange system performances (assuming loop wire at 0.5 mm) using a variety of VDSL masks and applied at a cabinet-to-exchange distance of 2000 m with system performance measured in downstream data rate over distance.

FIG. 13 represents a summary of simulations involving multiple masks and the resulting performance profile with the assumptions of y set at 2 km and loop wire set at 0.5 mm gauge. Simulation plots 1302-1308 (right-most plots generally) represent cabinet system performance and assume VDSL performance with various masks and 25 self VDSL disturbers. Because y is set at 2 km, the distance of the cabinet from the exchange, the graphs begin at 2 km. The difference in the plots is a result of the different masks applied from 1302-1308. Plot 1302 assumes cabinet mask M1 that starts at 138 kHz and has the widest mask and yields highest performance of the simulations for the cabinet system. Plot 1308 assumes an exchange mask (14 dBm) and performs about to the level of plot 1302. Plot 1306 assumes a starting point of 2.2 MHz and yields the poorest performance of the simulations. The VERI applied mask plot 1340 associated with the present invention falls in the middle as far as cabinet performance. Plots 1320-1328 (left-most plots generally) represent exchange performance and assume 25 self ADSL2+ disturbers and 25 self VDSL disturbers from the cabinet system. The difference in the plots is a result of the different masks applied on VDSL in cabinet system. Plots 1340 and 1342 represent, respectively, VDSL (cabinet) and ADSL2+ (exchange) plots in accordance with the present invention. As illustrated, the use of the VERI masks results in small degradation in performance on the VDSL cabinet system and virtually no impact on the ADSL2+ exchange system.

Figure 14:
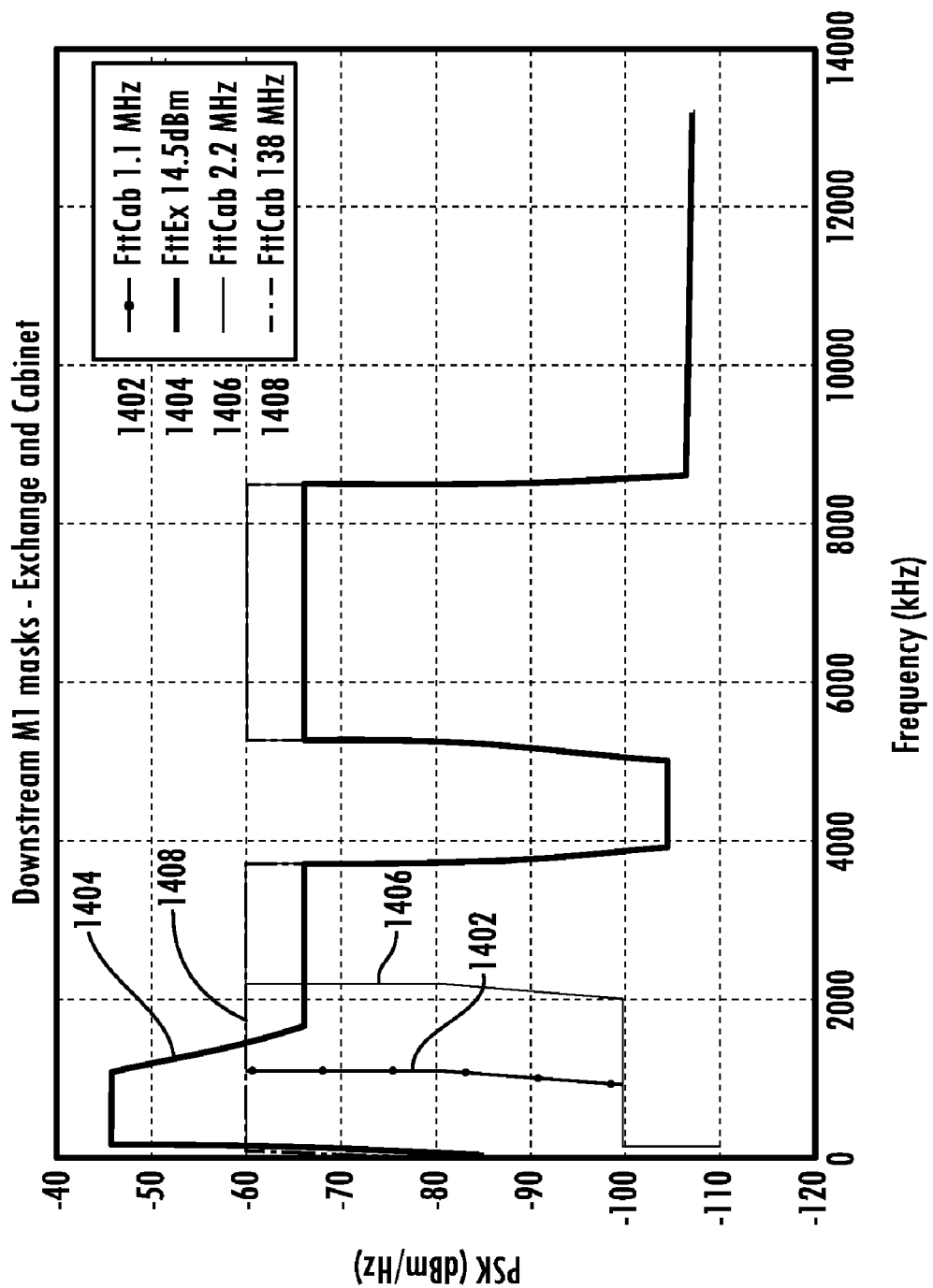
FIG. 14 is a graph depicting the VDSL downstream masks of FIG. 13.

FIG. 14 is a graph illustrating the various performance characteristics associated with the VDSL Downstream MI masks of FIG. 13, namely cabinet masks 1.1 MHz 1402, 2.2 MHz 1406 and 138 kHz 1408 and exchange mask 14.5 dBm 1404.

Figure 15:
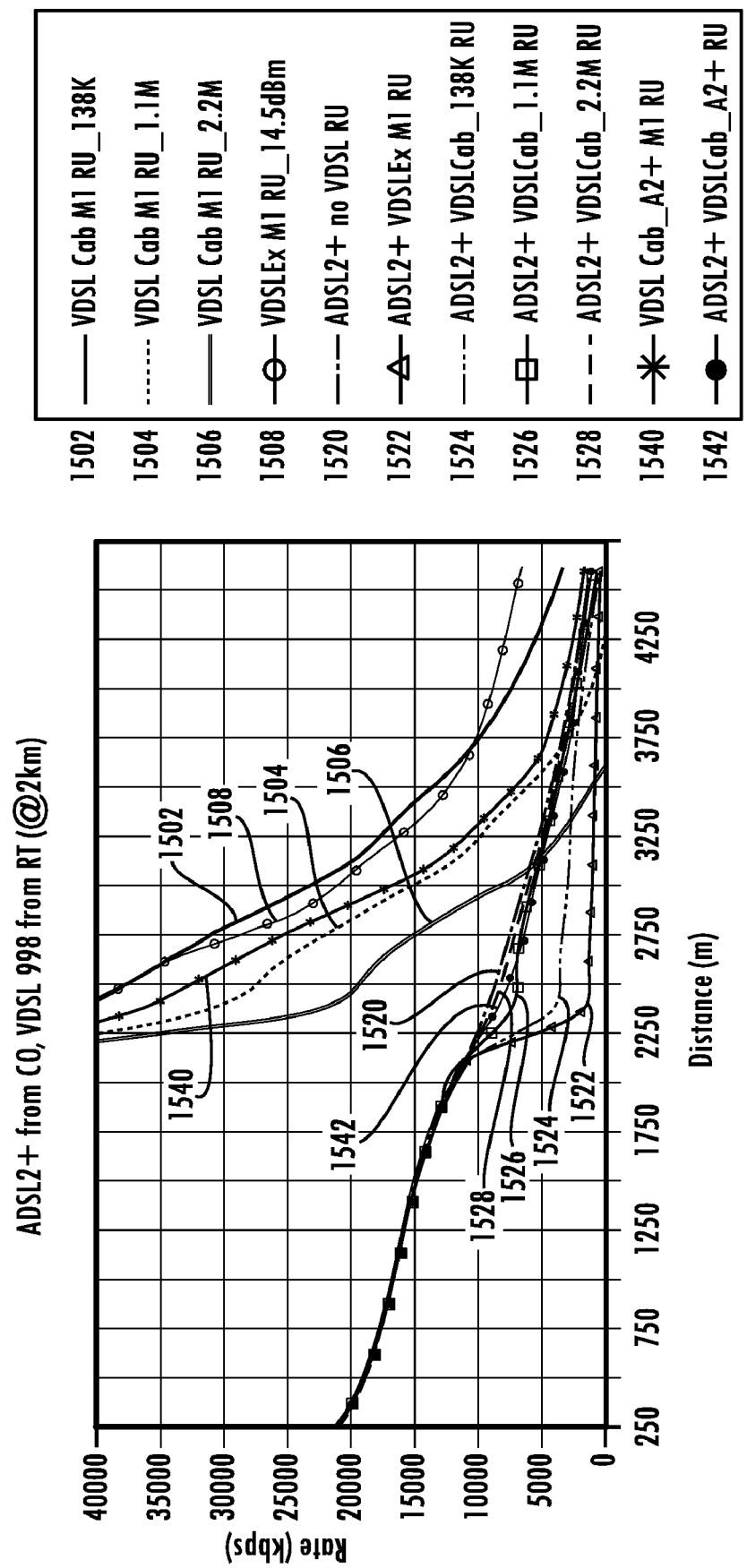
FIG. 15 is a graph depicting a series of simulations of cabinet and exchange system performances (assuming loop wire at 0.4 mm) using a variety of VDSL masks and applied at a cabinet-to-exchange distance of 2000 m with system performance measured in downstream data rate over distance.
Figure 16:
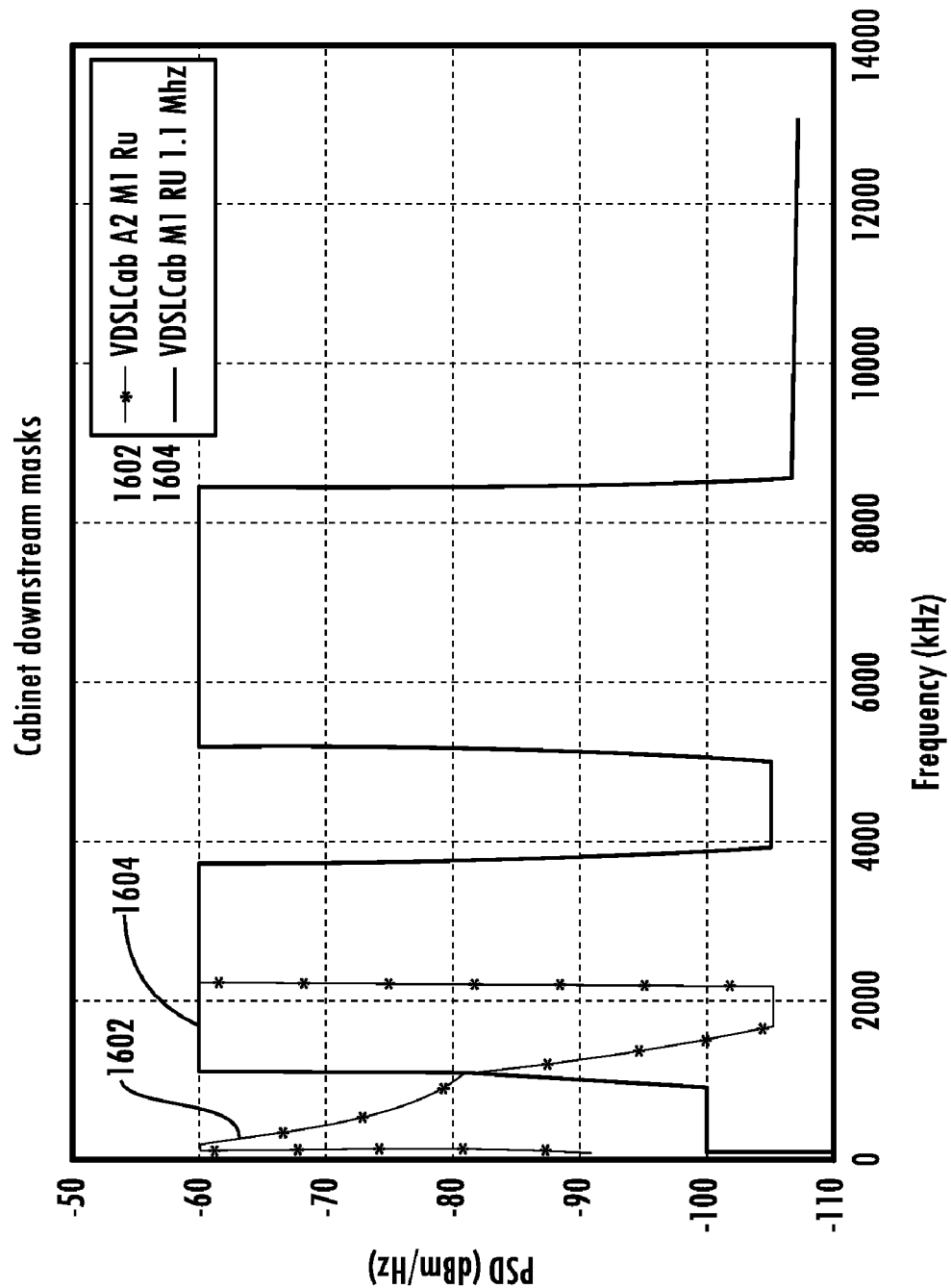
FIG. 16 is a graph depicting VERI and 1.1 MHz downstream mask performance.

FIG. 15 represents a summary of simulations involving multiple masks and the resulting performance profile with the assumptions of y set at 2 km and loop wire set at 26 AWG (0.4 mm). Simulation plots 1502-1508 (right-most plots generally) represent cabinet system performance and assume VDSL performance with various masks and 25 self VDSL disturbers. The difference in the plots is a result of the different masks applied from 1502-1508. Plot 1502 assumes cabinet mask M1 that starts at 138 kHz and has the widest mask and yields highest performance of the simulations for the cabinet system. Plot 1508 assumes an exchange mask (14 dBm) and performs about to the level of plot 1502. Plot 1506 assumes a starting point of 2.2 MHz and yields the poorest performance of the simulations. The VERI applied mask plot 1540 associated with the present invention falls in the middle as far as cabinet performance. Plots 1520-1508 (left-most plots generally) represent exchange performance and assume 25 self ADSL2+ disturbers and 25 self VDSL disturbers from the cabinet system. The difference in the plots is a result of the different masks applied on VDSL in cabinet system. Plots 1540 and 1542 represent, respectively, VDSL (cabinet) and ADSL2+ (exchange) plots in accordance with the present invention. As illustrated, the use of the VERI masks results in small degradation in performance on the VDSL cabinet system and virtually no impact on the ADSL2+ exchange system.

Other embodiments, uses, and advantages of the invention will be apparent to those skilled in the art from consideration of the specification and practice of the invention disclosed herein. The specification and drawings should be considered exemplary only, and the scope of the invention is not intended to be limited to the exemplary embodiments.

We claim:

1. A digital subscriber line (DSL) communications system comprising:
    a bundled system having an exchange system electromagnetically coupled to a cabinet system, and
    a power spectral density (PSD) mask pattern for spectral shaping a VDSL mask applied to the cabinet system such that impact experienced by the exchange system from the cabinet system replicates self-impact experienced by the exchange system, wherein capacity of the exchange system is increased when the exchange system is deployed in a same bundle as the cabinet system, the PSD mask shaping pattern represented by an equation:

$C[f,0] \propto E[f,y] = E[f,0]/H_E[f,y]^2$; where:

C[f,0] denotes the transmitted PSD from the cabinet system;
    E[f,0] denotes a transmitted PSD from the exchange system;
    E[f,y] denotes an attenuated exchange PSD by an exchange loop of length y;
    $H_E$[f,y] denotes the frequency response of the exchange loop; and
    y represents the distance from the cabinet system to the exchange system where $f_3 B_E$ and $B_E$ is a common bandwidth.

2. The PSD mask shaping pattern of claim 1, wherein the impact into the exchange system being minimized is FEXT.

3. The PSD mask shaping pattern of claim 2, wherein the exchange and cabinet systems have a common bandwidth.

4. The PSD mask shaping pattern of claim 1, wherein the exchange system is a Central Office and is in communication with a first customer premises equipment.

5. The PSD mask shaping pattern of claim 1, wherein the cabinet system is a remote terminal and is in communication with a second customer premises equipment.

6. A digital subscriber line (DSL) communications system comprising: a bundled system having an exchange system electromagnetically coupled to a cabinet system, a power spectral density (PSD) mask pattern for spectral shaping a VDSL mask applied to the cabinet system such that impact experienced by the exchange system from the cabinet system replicates self-impact experienced by the exchange system, wherein capacity of the exchange system is increased when the exchange system is deployed in a same bundle as the cabinet system, PSD mask the shaping pattern represented by an equation:

$C[f,0] < E[f,y]$ where C[f,0] denotes a transmitted PSD from the cabinet system;
    $E[f,y] = E[f,0]|H_E[f,y]|^2$ and denotes an attenuated exchange PSD by an exchange loop of length y; E[f,0] denotes a transmitted PSD from the exchange system;
    HE[f,y] denotes the frequency response of the exchange loop; and
    y represents the distance from the cabinet system to the exchange system where $f_3 B_E$ and $B_E$ is a common bandwith.

7. The PSD mask shaping pattern of claim 6, wherein the exchange system is a Central Office and is in communication with a first customer premises equipment.

8. The PSD mask shaping pattern of claim 6, wherein the cabinet system is a remote terminal and is in communication with a second customer premises equipment.

9. The PSD mask shaping pattern of claim 6, wherein the exchange and cabinet systems have a common bandwidth.

10. A digital describer line (DSL) communications network, a bundled system comprising:
    an exchange system electromagnetically coupled to a cabinet system, the cabinet system having a transmitted power spectral density (PSD), C[f,0], that is proportional to an exchange system PSD, E[f,y], as attenuated by an exchange loop of length y,
    wherein y represents the distance of the cabinet system from the exchange system where $f_3 B_E$ and $B_E$ is a common bandwidth, and
    wherein impact experienced by the exchange from the cabinet system replicates self-impact experienced by the exchange system, wherein capacity of the exchange system is increased when the exchange system is deployed in a same bundle as the cabinet system;
    wherein C[f,0]=E[f,y]; and wherein $E[f,y] = E[f,0]|H_E[f, y]|^2$, E[f,0] denotes a transmitted PSD from the exchange system; and $H_E$[f,y] designates the frequency response of the exchange loop.

11. The system of claim 10, wherein the exchange and cabinet systems have a common bandwidth.

12. The system of claim 10, wherein the exchange system is a Central Office and is in communication with a first customer premises equipment.

13. The system of claim 10, wherein the cabinet system is a remote terminal and is in communication with a second customer premises equipment.

14. The system of claim 10, wherein the exchange loop comprises 0.5 mm wire.

15. The system of claim 10, wherein the exchange loop comprises 26 AWG wire.

16. The system of claim 10 wherein the cabinet system PSD is slightly less than the attenuated exchange system PSD.

17. The system of claim 10, wherein the exchange and cabinet systems utilize one or more of the following standards: ITU-T G.992.5/ADSL2+; ETSI TS101-270/VDSL; and ANSI T1.424/VDSL.

18. The system of claim 10, wherein the attenuated exchange PSD at exchange loop y represents a virtual exchange reference impact determined based on the distance y of the cabinet system from the exchange system.

\* \* \* \* \*